United States Patent [19]

Ishimaru

[11] Patent Number: 4,907,471
[45] Date of Patent: Mar. 13, 1990

[54] V-BELT TYPE CONTINUOUSLY VARIABLE TRANSMISSION

[75] Inventor: Wataru Ishimaru, Ebina City, Japan

[73] Assignee: Nissan Motor Co., Ltd., Yokohama, Japan

[21] Appl. No.: 278,887

[22] Filed: Dec. 2, 1988

[30] Foreign Application Priority Data

Dec. 4, 1987 [JP] Japan .............. 62-305959

[51] Int. Cl.$^4$ .............. F16H 37/00
[52] U.S. Cl. ............ 74/745; 475/206; 475/210
[58] Field of Search ......... 74/689, 694, 695, 700, 74/701, 745, 357, 359; 192/48.92; 474/69, 70, 11, 12, 17

[56] References Cited

U.S. PATENT DOCUMENTS

| 3,203,277 | 8/1965 | General ............ 74/689 |
| 4,294,137 | 10/1981 | Piret et al. ......... 74/665 |
| 4,548,100 | 10/1985 | Höhn ............... 74/689 |
| 4,660,438 | 4/1987 | Tatara et al. ........ 74/689 |
| 4,736,652 | 4/1988 | Shimamoto .......... 74/689 |

FOREIGN PATENT DOCUMENTS

| 4412 | 10/1979 | European Pat. Off. ........ 74/689 |
| 4487 | 10/1979 | European Pat. Off. . |
| 119935 | 9/1984 | European Pat. Off. . |
| 141605 | 5/1985 | European Pat. Off. ........ 74/701 |
| 53-137375 | 11/1978 | Japan . |
| 56-97661 | 8/1981 | Japan . |
| 205058 | 11/1984 | Japan ............... 74/701 |
| 60-220258 | 11/1985 | Japan . |
| 60-249758 | 12/1985 | Japan . |
| 61-177759 | 1/1986 | Japan . |
| 8200564 | 1/1983 | Netherlands ......... 74/701 |
| WO85/2663 | 6/1985 | PCT Int'l Appl. ..... 74/694 |
| 2025545 | 1/1980 | United Kingdom . |

Primary Examiner—Leslie A. Braun
Assistant Examiner—Christopher Campbell
Attorney, Agent, or Firm—Foley & Lardner, Schwartz, Jeffery, Schwaab, Mack, Blumenthal & Evans

[57] ABSTRACT

According to the present invention, there is provided a V-belt type contiuously variable transmission wherein the lowest forward speed ratio is accomplished by drivingly connecting a forward low gear to a transmission input shaft when a forward low clutch is engaged, and wherein a shift to the adjacent next low forward speed ratio higher than the lowest forward speed ratio is made when a forward high clutch is engaged with the forward low clutch kept engaged, therby to allow continuous variation of speed ratio, and wherein a reverse speed ratio is accomplished by engaging a reverse gear to the transmission input shaft when a reverse clutch is engaged. There is provided a gear train meshing with the reverse gear and arranged in parallel to the one-way clutch. Thus, a power delivery path during the reverse speed ratio is established through the reverse gear and the gear train arranged in parallel to the one-way clutch.

8 Claims, 6 Drawing Sheets

V-BELT TYPE CONTINUOUSLY VARIABLE TRANSMISSION

BACKGROUND OF THE INVENTION

The present invention relates to a V-belt type continuously variable transmission.

JP No. 60-249758 discloses a V-belt type continuously variable transmission wherein a power delivery path at the lowest speed ratio is established through a gear train, while a power delivery path at any speed ratio higher than the lowest speed ratio is established through a V-belt power transmission train.

In this known continuously variable transmission, a provision is made to secure a smooth shift between the lowest speed ratio and the adjacent next low speed ratio higher than the lowest speed ratio without any complicated sequence of switching operation of clutches. The provision is in that when a forward low clutch is established, the lowest speed ratio, namely a forward low gear position, is accomplished by engaging a forward low gear to an input shaft, thereby to establish a power delivery path through a gear meshing with this forward low gear and a one-way clutch, and a shift to the adjacent next low speed ratio higher than the lowest speed ratio is made when a forward high clutch is engaged with the forward low clutch kept engaged. According to this provision, the smooth shift from the lowest speed ratio to the adjacent next low speed ratio is effected with the forward low clutch kept engaged owing to overrunning of the one-way clutch.

According to this known transmission, a reverse gear train includes the above-mentioned one-way clutch. This arrangement of the reverse gear train does not transmit a reverse torque from road wheels to the input shaft since the reverse torque causes the one-way clutch to overrun. Thus, engine brake running is not provided when the vehicle travels in a reverse direction and down a steep hill-climbing road.

Therefore, an object of the present invention is to provide a V-belt type continuously variable transmission wherein the above-mentioned problem is eliminated with the smooth shift using one-way clutch maintained.

SUMMARY OF THE INVENTION

According to the present invention, there is provided a V-belt type continuously variable transmission, comprising:

an input shaft;
an output shaft;
a forward low power transmission gear train arranged between said input and output shafts to provide the lowest forward speed ratio, said forward low power transmission gear train including a forward low gear rotatable relative to said input shaft and means for interrupting drive connection of said forward low power transmission gear train to said output shaft;
forward low clutch means for drivingly connecting said forward low gear to said input shaft;
a V-belt power transmission train arranged between said input and output shafts to provide continuously a pulley reduction ratio ranging from the largest reduction ratio corresponding to the adjacent next low forward speed ratio higher than said lowest forward speed ratio to the smallest pulley reduction ratio corresponding to the highest forward speed ratio;
forward high clutch means for drivingly connecting said V-belt power transmission train to said output shaft;
a reverse power transmission gear train arranged between said input and output shaft in parallel to said drive connection interrupting means, said reverse power transmission gear train including a reverse gear rotatable relative to said input shaft; and
reverse clutch means for drivingly connecting said reverse gear to said input shaft.

DETAILED DESCRIPTION OF THE INVENTION

Figure 1:
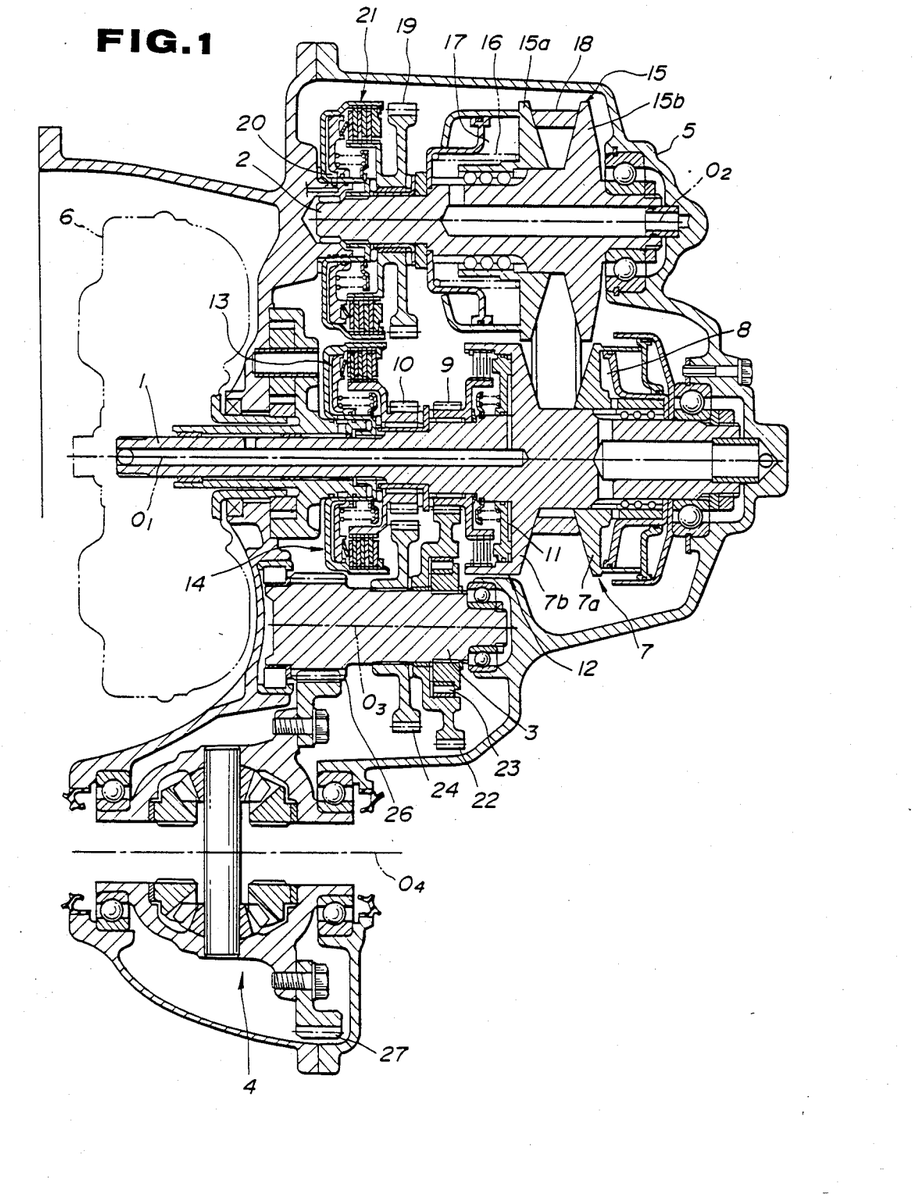
FIG. 1 is a section of a first embodiment of a V-belt type continuously variable transmission, the section through the line I-I in FIG. 2.
Figure 2:
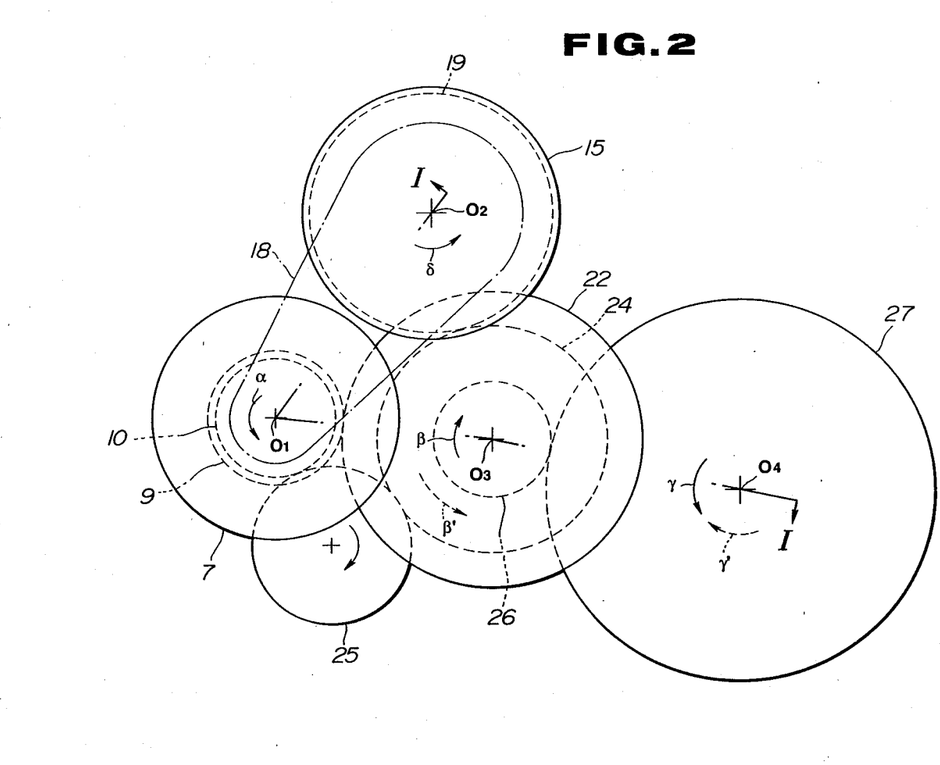
FIG. 2 is a diagrammatic view showing an arrangement including a V-belt pulley unit, a predetermined gear meshing with a forward low gear, a final drive pinion, a final drive ring gear, and a reverse meshing with a reverse gear.

Referring to FIG. 1, there is shown a transaxle including a V-belt type continuously variable transmission. The transmission comprises a transmission input shaft 1, an intermediate shaft 2, and a transmission output shaft 3. The transaxle also includes a differential gear 4. The input shaft 1, the intermediate shaft 2, the output shaft 3, and the differential gear 4 are rotatably mounted in a transmission case 5 and have axes of rotation $O_1$, $O_2$, $O_3$, and $O_4$ which are arranged as shown in FIG. 2.

As viewed in FIG. 1, a lefthand end of the input shaft 1 is splined to a turbine of a torque converter 6 which has a pump impeller drivingly connected to an engine crankshaft. At the righthand end portion of the input shaft 1, as viewed in FIG. 1, is mounted a primary pulley 7. The primary pulley 7 includes a mutually facing conical disc flanges 7a and 7b which define therebetween a V-shaped pulley groove. The flange 7b is formed integrally with the input shaft 1 and thus stationary relative to the input shaft 1. However, the other flange 7a is axially movable relative to the input shaft 1 in response to a shift effecting hydraulic pressure supplied to a servo chamber 8. Thus, the width of the V-shaped pulley groove is variable in response to axial displacement of the movable flange 7a toward the stationary flange 7b. along the axis of rotation $O_1$. 01 At its middle portion between the both end portions, the input shaft 1 rotatably supports a forward low gear 9 and a reverse gear 10. The forward low gear 9 is integrally formed with a clutch element of a forward low clutch 12. The forward low clutch 12 has the other clutch elements arranged in an annular extension of the stationary flange 7b so that when the clutch 12 is engaged in response to hydraulic fluid developed in a servo chamber 11, the forward low gear 9 is drivingly connected to the stationary flange 7b of the primary pulley 7. Thus, when the forward low clutch 12 is engaged, the forward low gear 9 is drivingly connected via the stationary flange 7b to the input shaft 1. The reverse gear 10 is integrally formed with a clutch element of a reverse clutch 14 which has an outer clutch drum splined to the input shaft 1 so that when the clutch 14 is engaged, the reverse gear 10 is drivingly connected to the input shaft 1.

Arranged on the intermediate shaft 2 is a secondary pulley 15. The secondary pulley 15 includes a mutually facing conical disc flanges 15a and 15b which define therebetween a V-shaped pulley groove. The flange 15b is formed integrally with the intermediate shaft 2 and thus stationary relative to the intermediate shaft 2. However, the other flange 15a is axially movable relative to the intermediate shaft 2 in response to a shift effecting hydraulic pressure supplied to a servo chamber 17 and a force of a spring 16 arranged within the servo chamber 17. Thus, the width of the V-shaped pulley groove is variable in response to axial displacement of the movable flange 15a toward the stationary flange 15b along the axis of rotation $O_2$. A V-belt 18 is tensioned between the primary and secondary pulleys 7 and 15. The intermediate shaft 2 rotatably supports a forward high gear 19. The forward high gear 19 is integrally formed with a clutch element of a forward high clutch 21. The forward high clutch 21 has an outer clutch drum splined to the intermediate shaft 2 so that when the clutch 21 is engaged the forward high gear 19 is drivingly connected to the intermediate shaft 2.

Rotatably supported by the output shaft 3 is a gear 22 meshing with the above-mentioned forward low gear 9. Disposed between the gear 22 and the intermediate shaft 2 is a one-way clutch 23. The one-way clutch 23 transmits a torque from the gear 22 to the output shaft 3 when the forward low gear 9 is drivingly connected to the input shaft 1 upon engagement of the forward low clutch 12. The output shaft 3 supports a gear 24 splined thereto for rotation therewith. This gear 24 meshes with a reverse idler gear 25 which in turn meshes with the reverse gear 10, as shown in FIG. 2. As viewed in FIG. 1, the output shaft 3 has a final drive pinion 26 formed on a lefthand end portion thereof. The final drive pinion 26 meshes with a final drive ring gear 27 of the differential gear 4.

The V-belt pulley unit 7, 15 and 18 is designed such that when the torque is transmitted via the V-belt, the pulley unit can provide the largest pulley reduction ratio which in turn results in a low speed ratio that is near a second speed ratio provided by a usual ordinary four speed automatic transmission and the smallest pulley reduction ratio which in turn results in a highest speed ratio that is near a fourth speed ratio provided by the four speed automatic transmission. Thus, the shift range covered by the power transmission by the V-belt 18 is small. In this embodiment, the shift range is approximately 2.8 if expressed in terms of a ratio of the low speed ratio to the highest speed ratio.

The operation of this embodiment is explained.

Engine power which has been multiplied by the torque converter 6 is fed to the input shaft 1. However, when the clutches 12, 14 and 21 are disengaged, rotation in a direction as indicated by an arrow alpha of the input shaft 1 (see FIG. 2) is not transmitted to the output shaft 3. Thus, the vehicle can stay at standstill.

When the forward low clutch 12 is engaged to drivingly connect the forward low gear 9 to the input shaft 1, the rotation as indicated by arrow alpha of the input shaft 1 is transmitted via the forward low gear 9, gear 22 and one-way clutch 23 to the output shaft 3 formed with the pinion 26, causing the output shaft 3 with the pinion 26 to rotate in a direction as indicated by an arrow beta as shown in FIG. 2. The rotation beta of the pinion 26 causes the differential gear 4 to rotate in a direction as indicated by an arrow gamma. As a result, the vehicle can travel forward at the lowest speed ratio.

When, subsequently, the forward high clutch 21 is engaged with the forward low clutch 12 kept engaged to drivingly connect the forward high gear 19 to the intermediate shaft 2, rotation of the secondary pulley 15 in a direction as indicated by an arrow delta, which results from transmission of power via the V-belt 18 to the secondary pulley 15 from the primary pulley 7 rotatable with the input shaft 1, is transmitted via the forward high gear 19 to the gear 24 splined to the output shaft 3, causing the output shaft 3 to rotate in the direction as indicated by the arrow beta at a higher speed as compared to the previously described case. This causes the one-way clutch 23 to overrun, permitting the output shaft 3 to rotate at this higher speed. As a result, the differential gear 4 is allowed to rotate at a speed higher than a speed which the differential gear 4 was rotated at in the previously described case. Owing to the provision of the one way clutch 23, a smooth shift is made only by engaging the forward high clutch 21 with the forward low clutch 12 kept engaged.

Thereafter, the speed ratio is continuously varied between the low speed ratio and the highest speed ratio by varying a pulley reduction ratio between the primary pulley 7 and the secondary pulley 15. A predetermined constant pressure called a pulley pressure is supplied to the chamber 17. The V-belt 18 is firmly interposed by the flanges 15a and 15b of the secondary pulley 15 with a sum of a force derived from the pulley pressure and a force of the spring 16. The hydraulic fluid pressure developed in the chamber 8 is varied in response to running condition of the vehicle so as to vary the running diameter of the V-belt 18 on the primary pulley 7 in relation to that on the secondary pulley 15.

When the reverse drive is desired, the reverse clutch 14 is engaged to drivingly connect the reverse gear 10 to the input shaft 1. Rotation of the input shaft in the direction as indicated by the arrow alpha is transmitted via the reverse idler gear 25 to the gear 24, causing the gear 24 to rotate in a direction as indicated by an arrow beta dash. This causes the differential gear 4 to rotate in an opposite direction as indicated by an arrow gamma dash. As a result, the vehicle can travel in the reverse direction.

From the preceding description, it will be noted that the gear train including gears 24, 25 and 26 meshes with the reverse gear 10 and works to transmit torque to the final gear 4 bypassing the one-way clutch 23. In other words, the gear train 24, 24 and 26 is arranged in parallel to the one-way clutch 23. The one-way clutch 23, therefore, does not play any role in a power delivery path established in the reverse drive. Thus, effective engine brake running is provided during the reverse drive.

Figure 3:
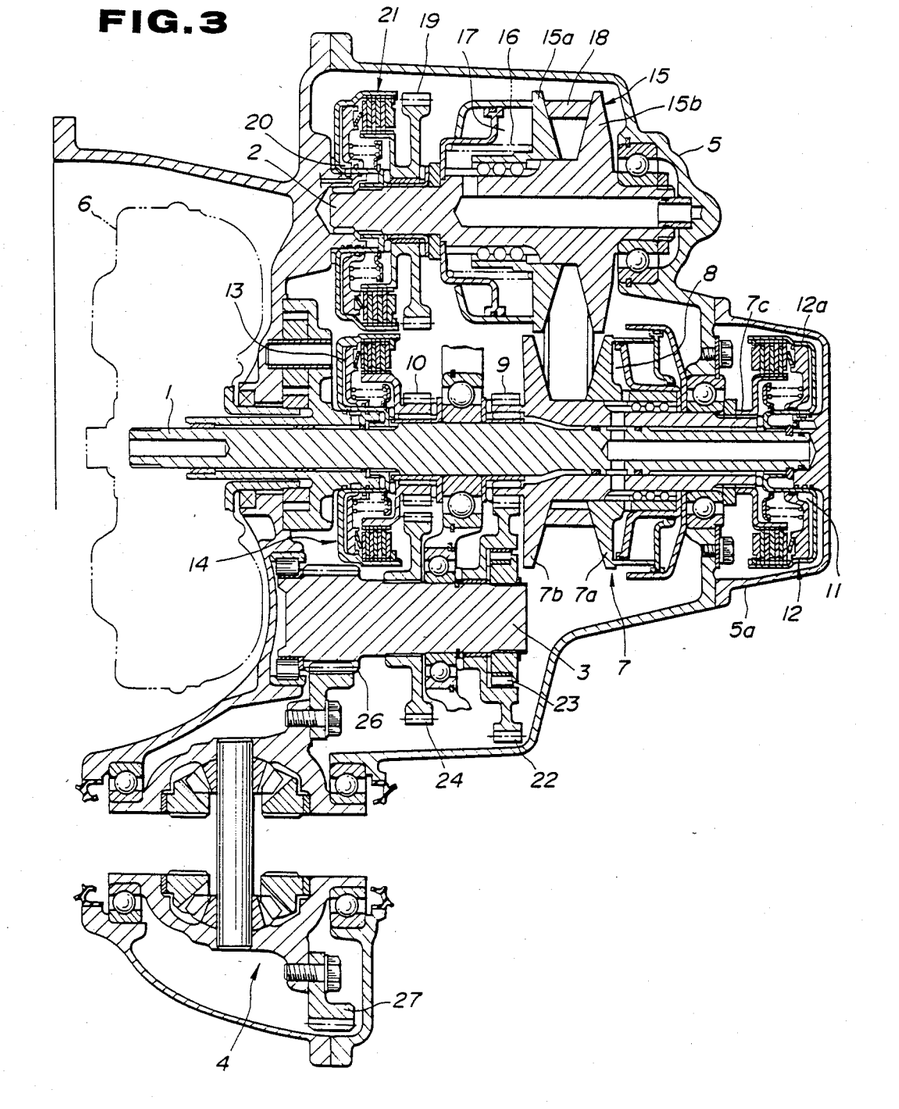
FIG. 3 is a similar view to FIG. 1 but showing a second embodiment.

Referring to FIG. 3, the second embodiment illustrated is substantially the same as the first embodiment illustrated in FIG. 1 except the relation between an input shaft 1, a primary pulley 7, and a forward low gear 9. As shown in FIG. 3, the primary pulley 7 is rotatably supported by the input shaft 1. The primary pulley 7 has two mutually facing conical disc flanges 7a and 7b. The flange 7b is formed with the forward low gear 9 and has a sleeve section 7c extending out of a transmission case 5. The sleeve section 7c terminates in an integral clutch element of the forward low clutch 12. The input shaft 1 extends through the sleeve section 7c out of the transmission case 5 and has splined thereto a clutch drum 12a of the forward low clutch 12. The forward clutch 12 is housed in a clutch casing 5a securely bolted to the transmission case 5. The other flange 7a is supported by the sleeve section 7c and displaceable toward the flange 7b in response to a hydraulic fluid pressure developed in a servo chamber 8. When hydraulic fluid pressure builds up in a servo chamber 11, the forward low clutch 12 is engaged to drivingly connect the forward low gear to the input shaft 1 via the flange 7b of the primary pulley 7.

Figure 4:
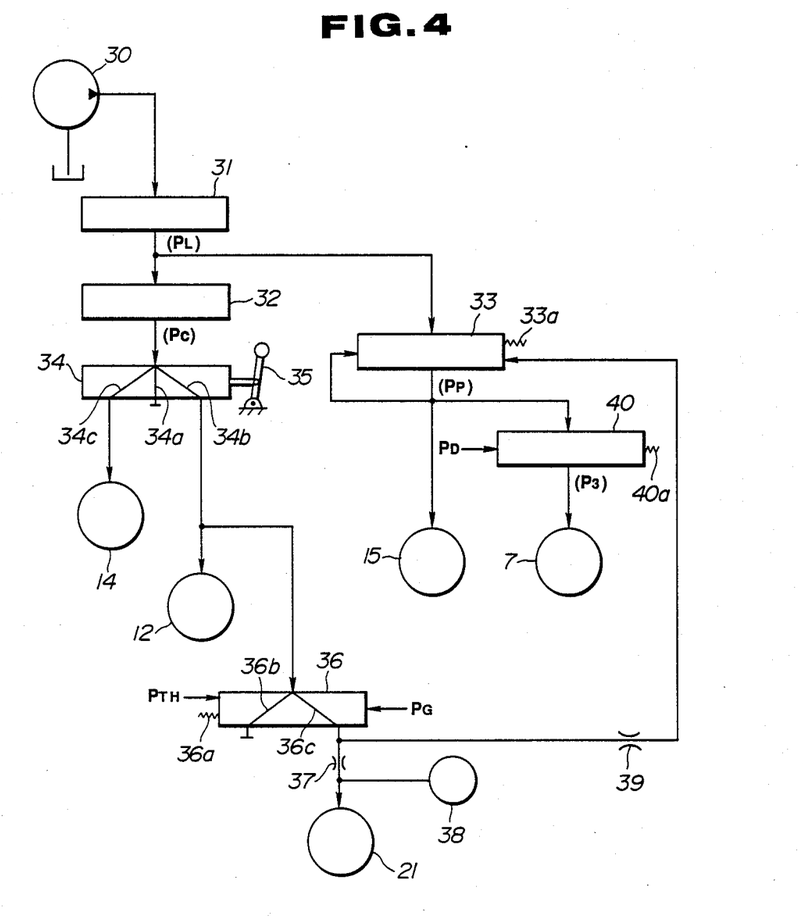
FIG. 4 is a circuit diagram of a hydraulic control system for the first and second embodiments.

FIG. 4 shows a hydraulic control system for the V-belt continuously variable transmission shown in FIG. 1 or 3. The system comprises a pump 30, a pressure regulator valve 31 which receives hydraulic fluid under pressure from the pump 30 to effect pressure regulation to generate a line pressure $P_L$. The line pressure $P_L$ is supplied to a clutch pressure control valve 32 and also to a pulley pressure control valve 33. The clutch pressure control valve 32 effects a pressure regulation to generate a clutch pressure $P_C$ which is high enough to activate the clutches 12, 14 and 21. The pulley pressure control valve 33 effects pressure regulation to generate a pulley pressure $P_P$ which is high enough to create an appropriate gripping force with which the flanges 15a and 15b of the secondary pulley 15 grips the V-belt 18.

The clutch pressure $P_C$ is supplied to the manual valve 34. The manual valve 34 has three positions and shiftable between them when commanded by a driver via a manual lever 35. When the manual lever 35 is placed to a neutral or park position in response to the driver's demand to hold the vehicle at a halt, the manual valve 34 assumes a neutral or park position 34a where the clutch pressure $P_C$ is delivered to none of the clutches 12, 14 and 21. When the manual lever 35 is placed at a forward drive position, the manual valve 34 assumes a forward drive position 34b where the clutch pressure $P_C$ is delivered to the forward clutch 12 and also to a shift valve 36. When the manual lever 35 is placed at a reverse drive position, the manual valve 34 assumes a reverse drive position 34c where the clutch pressure $P_C$ is delivered to the reverse clutch 14.

When the manual valve 34 assumes the forward drive position 34b, the clutch pressure $P_C$ is always supplied to the forward clutch 12 to keep same engaged. However, the pressure $P_C$ is selectively supplied to the forward high clutch 21 under the control of the shift valve 36. The shift valve 36 is biased by a spring 36a and movable between a spring set position 36b where the clutch pressure $P_C$ is not delivered to the forward high clutch 21 and a second position 36c where the clutch pressure $P_C$ is delivered via an orifice 37 to the forward high clutch 21. The shift valve 36 is subject to a throttle pressure or throttle related pressure $P_{TH}$ variable with opening degree of engine throttle valve and urged toward the spring set position 36b. It is also subject to a governor pressure $P_G$ variable with vehicle speed and urged toward the second position 36c. The setting is such that when the vehicle speed exceeds a level predetermined for each of the opening degrees of engine throttle valve, the shift valve 36 takes the second position 36c. The supply of hydraulic fluid to the forward high clutch 21 is initiated immediately after the shift valve has shifted to the second position 36c, causing a forward high clutch activating hydraulic fluid pressure to develop in the chamber 20 of the forward high clutch 21 (see FIG. 1 or 3). Since the supply of hydraulic fluid is restricted and the hydraulic fluid is also supplied to an accumulator 38, the pressure build-up in the chamber 20 of the forward high clutch 21 proceeds gradually. This causes engagement of the forward high clutch 21 without any substantial shock.

The forward high clutch activating hydraulic pressure is also supplied via an orifice 39 to the pulley pressure control valve 33. The pulley pressure control valve 33 boosts the pulley pressure $P_P$ to a relatively high level which is determined by the force of a spring 33a and the high forward clutch activating hydraulic pressure. However, the pulley pressure $P_P$ generated by the pulley pressure control valve 33 drops to a relatively low level when there is no supply of forward high clutch activating hydraulic pressure. The provision of the orifice 39 causes a delay in transmission of the forward high clutch activating pressure to the pulley pressure control valve 33. Thus, during this delay, the pulley pressure $P_P$ in the chambers 8 and 17 of the primary and secondary pulleys 7 and 15 is relatively low so that the pulley unit provides the largest pulley reduction ratio owing to the force of the spring 16. Therefore, the V-belt power transmission train keeps providing the low speed ratio which is sufficiently near the lowest speed ratio provided by the gearing power train during this shift initiated by the shift valve 36, providing shockless shifting operation.

After this delay, the pulley pressure control valve 33 is subject to the forward high clutch activating hydraulic pressure, boosting the pulley pressure $P_P$ to the high pressure level. This high pulley pressure $P_P$ acts in the chamber 17 of the secondary pulley 15 to create a sufficiently high gripping force with which the flanges 15a and 15b grips the V-belt 18. On the other hand, the pulley pressure $P_P$ is supplied to the shift control valve 40. The shift control valve 40 is subject to force of a spring 40a on one hand and to a target pulley reduction ratio indicative hydraulic pressure $P_D$ on the other hand. This valve 40 effects pressure reduction to deliver shift effecting pressure $P_S$ to the chamber 8 of the primary pulley 7. This shift effecting pressure $P_S$ is variable in correspondance with variation of the target ratio indicative hydraulic pressure $P_D$. As a result, the running diameter of the V-belt 18 on the primary pulley 7 varies as the shift effecting pressure $P_S$ varies in response to a variation in the target ratio inicative hydraulic pressure $P_D$. In this manner, the pulley reduction ratio between the pulleys 7 and 15 is adjusted toward a target ratio which the target ratio indicative hydraulic pressure $P_D$ is indicative of.

Figure 5:
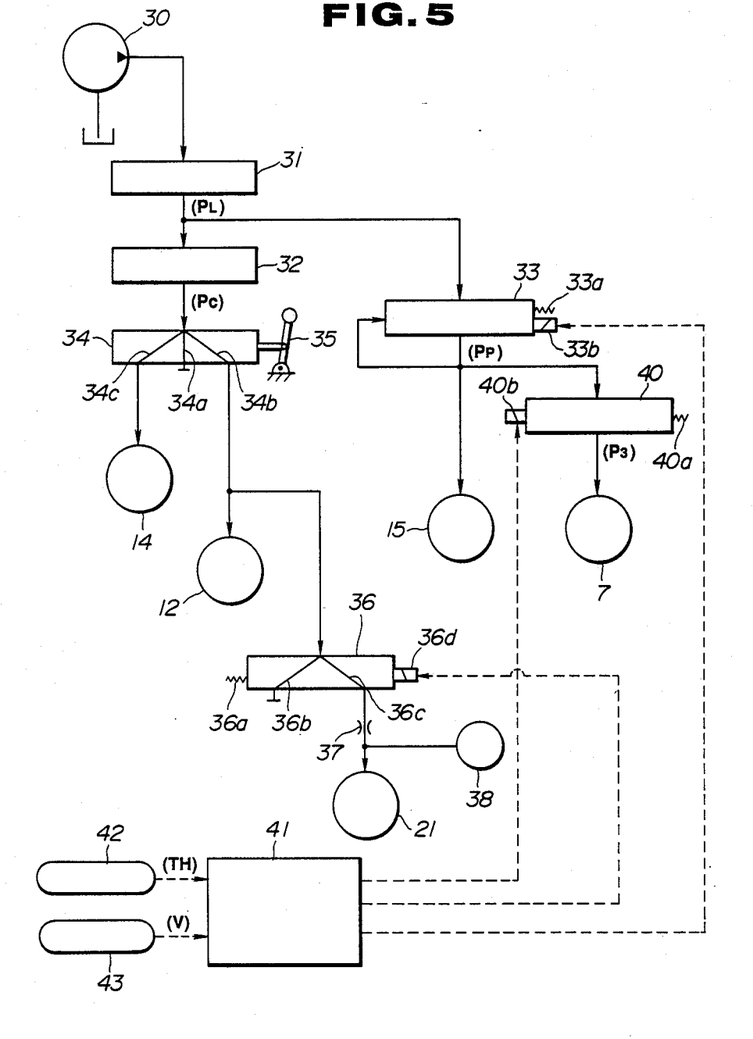
FIG. 5 is a similar view to FIG. 4, showing a modification of a hydraulic control system.

FIG. 5 shows a modified hydraulic control system for the V-belt type continuously variable transmission shown in FIG. 1 or 3. This modified hydraulic control system is substantially the same as that described in connection with FIG. 4 except that a pulley pressure control valve 33, a shift valve 36, and a shift control valve 40 have solenoids 33a, 36d, and 40b, respectively. These solenoids 33a, 36d, and 40b are controlled by a microcomputer based controller 41. Sensors 42 and 43 are provided to detect throttle opening degree TH and vehicle speed V. Outputs of these sensors 42 and 43 are supplied to the controller 41. Energizing or rendering the solenoid 33b ON causes the pulley pressure control valve 33 to deliver a pulley pressure $P_P$ a relatively high level, while deenergizing or rendering the solenoid 33 OFF causes the pulley pressure control valve 33 to deliver a pulley pressure $P_P$ with a relatively low level. Energizing or rendering the solenoid 36d ON causes the shift valve 36 to take a position as indicated at 36c where the hydraulic fluid is distributed to a forward high clutch 21 thereby to activate same, while deenergizing or rendering the solenoid 36d OFF causes the shift valve 36 to take a spring set position indicated at 36b where no hydraulic fluid is distributed to the forward high clutch 21. Increasing the duty factor of a drive signal supplied to the solenoid 40b causes the shift control valve 40 to increase a shift effecting pressure $P_S$, thus causing a decrease in the pulley reduction ratio.

The controller 41 includes a ROM containing a control program which will be hereinafter described along with a flowchart shown in FIG. 6. Execution of this control program is repeated upon expiration of a predetermined length of time.

Figure 6:
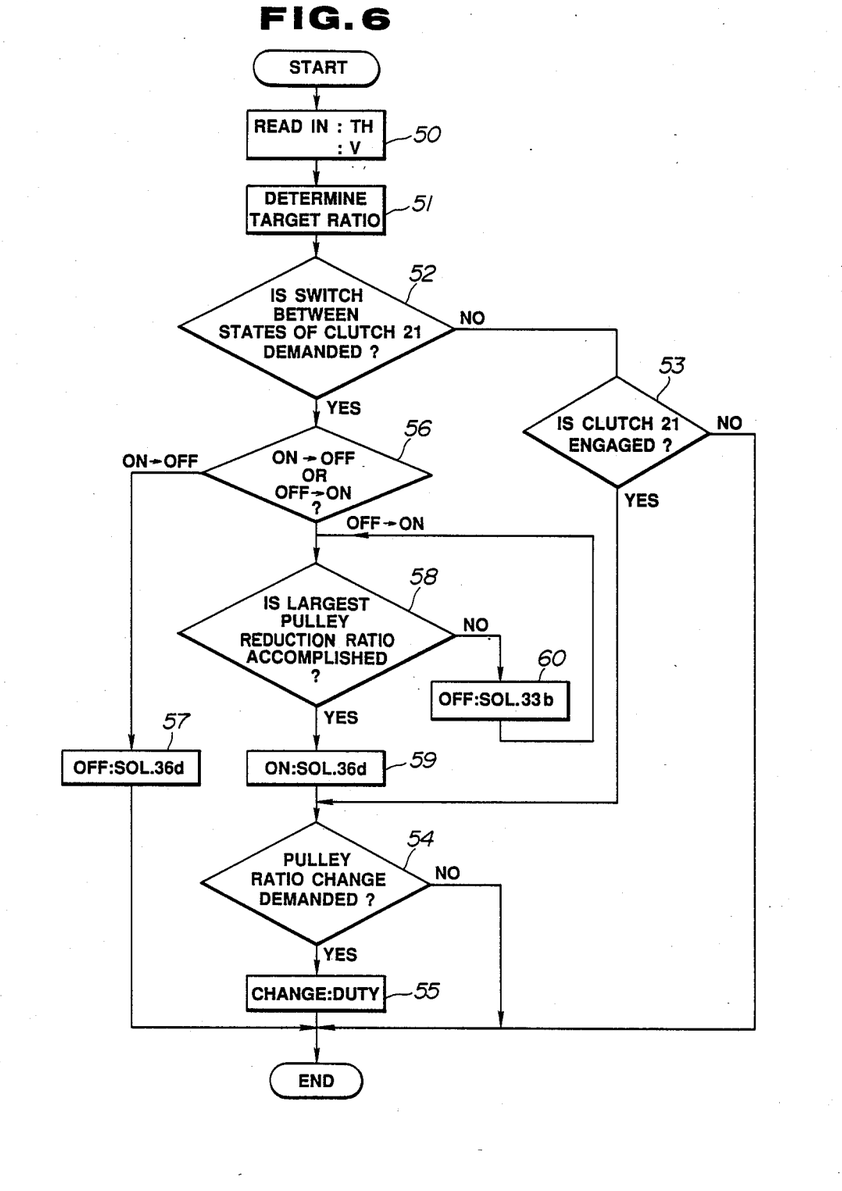
FIG. 6 is a flowchart of a control program stored in a controller used in the hydraulic control system shown in FIG. 5.

Referring to FIG. 6, at a step 50, the throttle opening degree TH and the vehicle speed V are stored via read-in operation of the outputs of the sensors 42 and 43. At the subsequent step 51, a target pulley reduction ratio for a set of the throttle opening degree TH and vehicle speed V stored in the previous step is determined by retrieving a table map, not shown. At the next step 52, a judgement is made on a result of comparison of an actual pulley reduction ratio with the previously determined target pulley reduction ratio to determine whether a switch between engagement state and disengagement state in the forward high clutch 21 is demanded or required If the answer to this inquiry at the step 52 is NO, a judgement is made at a step 53 whether or not the forward high clutch 21 is engaged. If it is found that the forward high clutch 21 is disengaged, the execution of this program terminates. If an answer to the inquiry at the step 53 is YES, a judgement is made based on the result of the comparison of the actual pulley reduction ratio with the target pulley reduction ratio whether or not a change or shift in pulley reduction ratio is demanded. If the answer to this inquiry is NO, the program terminates. If the answer to the inquiry at the step 54 is YES, the duty of the drive signal supplied to the solenoid 40b is varied to cause the shift control valve 40 to vary the magnitude of the shift effecting pressure $P_S$ thereby to vary the pulley reduction ratio. Thereafter, the program terminates.

It is judged at the step 52 if the forward high clutch 21 is to switch its state. A judgement is made at a step 56 whether the solenoid 36d is to change from ON state to OFF state or it is to change from OFF state to ON state. If the current state of the solenoid 36d is ON state and it is demanded for the solenoid 36d to assume OFF state, the control proceeds to a step 57 where the solenoid 36d is deenergized and rendered OFF. Then, the control program terminates. If the current state of the solenoid 36d is OFF state and it is demanded for the solenoid 36d to assume ON state, A judgement is made at a step 58 whether the largest pulley reduction ratio is accomplished or established. If the answer to this enquiry is YES, the solenoid 36d is energized or rendered ON at a step 59. Thus, the shift valve 36 is shifted to the position illustrated at 36c immediately, so that the supply of hydraulic fluid to the forward high clutch 21 begins immediately. This results in engagement of the forward high clutch 21 without any delay. If the pulley reduction ratio is still smaller than the largest pulley reduction ratio, the answer to the enquiry at the step 58 turns out to be NO. Then, the control proceeds to a step 60 where the solenoid 33b is deenergized or rendered OFF so that the pulley pressure $P_P$ is decreased to the relatively low level and the flanges 7a and 7b are spaced apart by the V-belt 18 to accomplish the largest reduction ratio. In this case, therefore, the solenoid 36d is not rendered ON until the largest pulley reduction ratio is accomplished after deenergization of the solenoid 33b. After executing the step 59, the previously mentioned steps 54 and 55 are executed.

What is claimed is:

1. A V-belt type continuously variable transmission, comprising:

an input shaft;

an output shaft;

a forward low power transmission gear train arranged between said input and output shafts to provide the lowest forward speed ratio, said forward low power transmission gear train including a forward low gear rotatable relative to said input shaft and means for interrupting drive connection of said forward low power transmission gear train to said output shaft;

forward low clutch means for drivingly connecting said forward low gear to said input shaft;

a V-belt power transmission train arranged between said input and output shafts to provide continuously a pulley reduction ratio ranging from the largest reduction ratio corresponding to the adjacent next low forward speed ratio higher than said lowest forward speed ratio to the smallest pulley reduction ratio corresponding to the highest forward speed ratio;

forward high clutch means for drivingly connecting said V-belt power transmission train to said output shaft;

a reverse power transmission gear train arranged between said input and output shaft in parallel to said drive connection interrupting means, said reverse power transmission gear train including a reverse gear rotatable relative to said input shaft; and reverse clutch means for drivingly connecting said reverse gear to said input shaft.

2. A V-belt type continuously variable transmission as claimed in claim 1, wherein said V-belt power transmission train includes an intermediate shaft, a primary pulley rotatable with said input shaft, a secondary pulley rotatable with said intermediate shaft, and a V-belt tensioned between said primary and secondary pulleys.

3. A V-belt type continuously variable transmission as claimed in claim 2, wherein said low gear is separate element from said primary pulley.

4. A V-belt type continuously variable transmission as claimed in claim 3, wherein said low clutch means include a clutch element integral with said low gear.

5. A V-belt type continuously variable transmission as claimed in claim 1, wherein said V-belt power transmission train includes an intermediate shaft, a primary pulley rotatable relative to said input shaft, a secondary pulley rotatable with said intermediate shaft, and a V-belt tensioned between said primary and secondary pulleys.

6. A V-belt type continuously variable transmission as claimed in claim 5, wherein said low gear is integral with said primary pulley.

7. A V-belt type continuously variable transmission as claimed in claim 6, wherein said low clutch means include a clutch element integral with said primary pulley.

8. A V-belt type continuously variable transmission as claimed in claim 1, wherein said drive connection interrupting means in the form of a one-way clutch.

* * * * *